(12) United States Patent
Xiong et al.

(10) Patent No.: US 10,906,585 B2
(45) Date of Patent: Feb. 2, 2021

(54) CHASSIS WITH WHEELS

(71) Applicant: UBTECH Robotics Corp, Shenzhen (CN)

(72) Inventors: Youjun Xiong, Shenzhen (CN); Kunlei Zhao, Shenzhen (CN); Wenhua Yu, Shenzhen (CN); Libing Zhou, Shenzhen (CN); Qi Zhao, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 119 days.

(21) Appl. No.: 16/233,142

(22) Filed: Dec. 27, 2018

(65) Prior Publication Data

US 2020/0017145 A1 Jan. 16, 2020

(30) Foreign Application Priority Data

Jul. 13, 2018 (CN) .......................... 2018 1 0772271

(51) Int. Cl.
*B62D 21/10* (2006.01)
*B62D 25/20* (2006.01)
*B25J 5/00* (2006.01)

(52) U.S. Cl.
CPC ............. *B62D 21/10* (2013.01); *B62D 25/20* (2013.01); *B25J 5/007* (2013.01)

(58) Field of Classification Search
CPC .......... B62D 21/10; B62D 25/20; B25J 5/007; B25J 9/0003
See application file for complete search history.

(56) References Cited

U.S. PATENT DOCUMENTS

2019/0329826 A1\* 10/2019 Tang ........................ B25J 19/00

FOREIGN PATENT DOCUMENTS

WO WO-2019114266 A1 \* 6/2019 .............. B25J 5/007

\* cited by examiner

*Primary Examiner* — D Glenn Dayoan
*Assistant Examiner* — Melissa Ann Bonifazi

(57) ABSTRACT

The present disclosure provides a chassis comprising a frame, two hanging units symmetrically provided at both sides of the frame, and a front guiding wheel and a rear universal wheel provided below the frame, wherein each of the hanging units comprises a mounting rack fixedly connected to the frame, a hanging rack slidably connected to the mounting rack, and a driving wheel rotatably connected to the hanging rack, and the front guiding wheel is provided with a first driving motor, and the driving wheel of each hanging unit is driven by a second driving motor, and wherein a closed loop speed control system is formed between the first driving motor and both second driving motors, such that a rotational angle of the front guiding wheel is adjustable via the first driving motor when revolving speeds of both second driving motors are changed.

17 Claims, 6 Drawing Sheets

CHASSIS WITH WHEELS

CROSS REFERENCE TO RELATED APPLICATIONS

This application claims priority to Chinese Patent Application No. 201810772271.7, filed Jul. 13, 2018, which is hereby incorporated by reference herein as if set forth in its entirety.

BACKGROUND

1. Technical Field

The present application relates to a field of chassis technology, and in particular to a chassis with wheels.

2. Description of Related Art

Recently, robot technology has been developed rapidly, and mobile service robots have been gradually used in commercial applications. Most of these service robots are wheeled robots and used for receiving and guiding customers. These service robots barely have performances for surmounting obstacles as they mostly work indoor on flat floors. In practical applications, rough terrains are inevitable even in indoor places such as hotels, airports or the like, and thus the robots are unable to work normally as soon as encountering the rough terrains. The reason is that in a current chassis structure of a robot, two universal wheels are provided in the front and rear. The robot would nod violently when braking hard, and would wiggle in a certain angle when turning. And further due to the limitation of the universal wheel itself, the universal wheel has a relatively small diameter and thus has a limited capability of surmounting obstacles, resulting in poor performance of the robot in surmounting obstacles.

BRIEF DESCRIPTION OF THE DRAWINGS

In order to more clearly illustrate the technical solutions of the embodiments according to the present application, drawings used in the embodiments of the present application or the description of the prior art will be briefly introduced below. It should be appreciated that the drawings described below merely illustrate some embodiments of the present application, and other drawings may be obtained by those skilled in the art without departing from the scope of the drawings.

DETAILED DESCRIPTION

Figure 1:
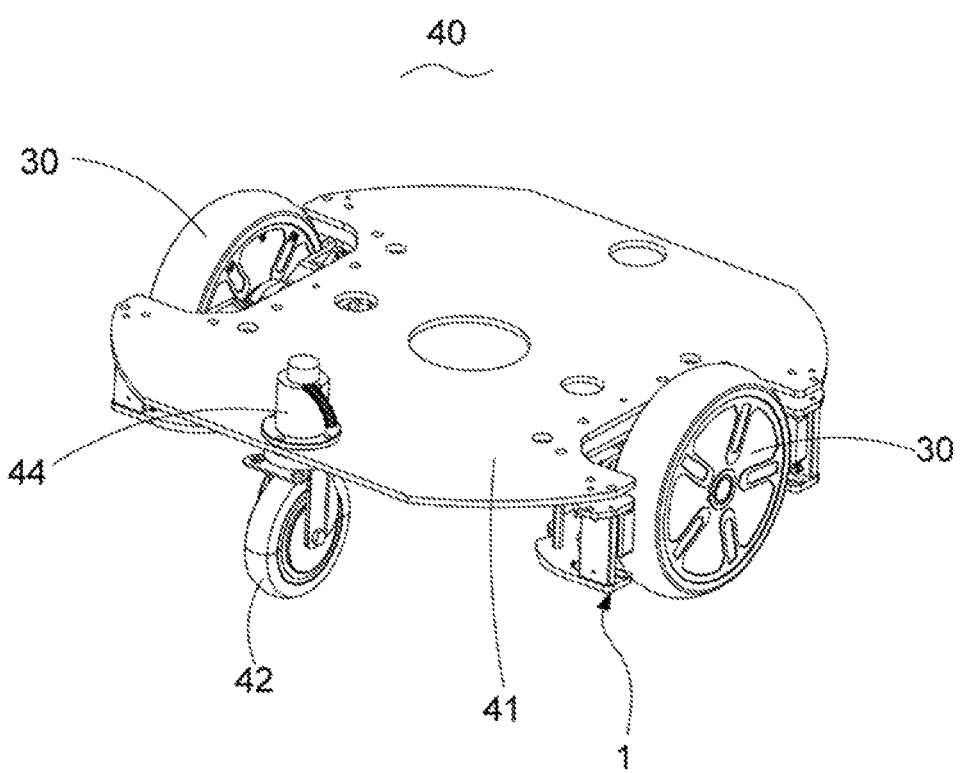
FIG. 1 schematically shows a structural view of a chassis according to an embodiment of the present application.

Embodiments of the present application are described in detail below with reference to the appending drawings. Equal and/or similar elements in the drawings can here be designated by equal and/or similar reference signs. The embodiments described below with reference to the drawings are intended to be illustrative of the application and are not to be construed as limiting the application.

In the description of the present application, it should be understood that the terms "length", "width", "upper", "lower", "front", "rear", "left", "right", "vertical", "horizontal", "top", "bottom", "inside", "outside" and the like are based on the orientation or positional relationship shown in the drawings, and are merely for convenience of description of the present application and for a simplified description, rather than indicating or implying that the device or component referred to must have a particular orientation, or must be constructed or operated in a particular orientation, and thus are not to be construed as limiting the application.

Moreover, the terms "first" and "second" are used for descriptive purposes only and are not to be construed as indicating or implying a relative importance or implicitly indicating the number of technical features indicated. Thus, features defined by "first" and "second" may include one or more of the features either explicitly or implicitly. In the description of the present application, "a plurality" means two or more, unless it is specifically and specifically defined otherwise.

In the present application, unless specifically stated and limited, the terms "mounted", "connected", "coupled", "fixed", and the like shall be used in a broad sense. For example, any one of them might refer to a non-detachable connection, a detachable connection, or an integral; it might refer to a mechanical connection or an electrical connection; it might refer to a direct connection or an indirect connection through an intermediate medium; it might refer to an internal connection of two elements or an interaction of two elements. The specific meanings of the above terms in the present application can be understood by those skilled in the art on a case-by-case basis.

As shown in FIG. 1, a chassis 40 is provided according to an embodiment of the present application. The chassis 40 includes a frame 41, two hanging units 1 symmetrically provided at both sides of the frame 41, as well as a front guiding wheel 42 and a rear universal wheel 43 provided below the frame 41. Each of the hanging units 1 includes a mounting rack 10 fixedly connected to the frame 41, a hanging rack 20 slidably connected to the mounting rack 10, and a driving wheel 30 rotatably connected to the hanging rack 20. The front guiding wheel 42 is provided with a first driving motor 44. The driving wheel 30 of each hanging unit 1 is driven by a second driving motor (not shown). A closed loop speed control system is formed between the first driving motor 44 and the two second driving motors, such that a rotational angle of the front guiding wheel 42 is adjusted via the first driving motor 44 when revolving speeds of the two second driving motors are changed.

Figure 2:
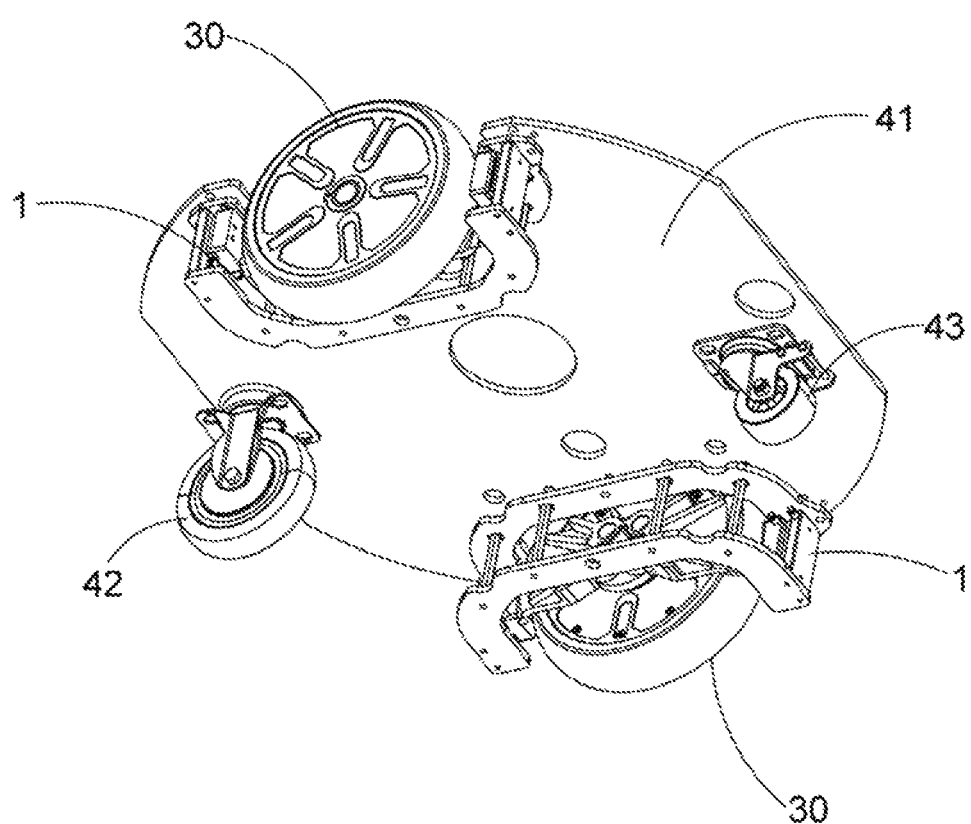
FIG. 2 schematically shows a further structural view of the chassis according to the embodiment of the present application.

In the embodiment of the present application, the first driving motor 44 is provided on the front guiding wheel 42, and the closed loop speed control system is formed between the first driving motor 44 and the two second driving motors of the two driving wheels 30, such that the front guiding wheel 42 has a capability of active adjustment that its rotational angle is adjustable in real time by the first driving motor 44 on the basis of the revolving speeds of the two second driving motors. In this way, the first driving motor 42 does not have to be designed as a universal wheel structure. In the case of a certain height of the chassis, the universal wheel should have a smaller size than the front guiding wheel as the universal wheel has its diameter limited by a rotating mechanism positioned on its top that drives it to rotate. In the present embodiment, the front guiding wheel 42 is not designed as a universal wheel, i.e. it does not require a rotating mechanism for driving it to rotate, such that the front guiding wheel might have a larger diameter that is not limited anymore. Moreover, in the present embodiment as shown in FIG. 2, the front guiding wheel 42 has a larger diameter than the rear universal wheel 43, in such a way that the front guiding wheel 42 performs better in surmounting obstacles, and a robot with such a chassis works more stably when surmounting obstacles.

Figure 3:
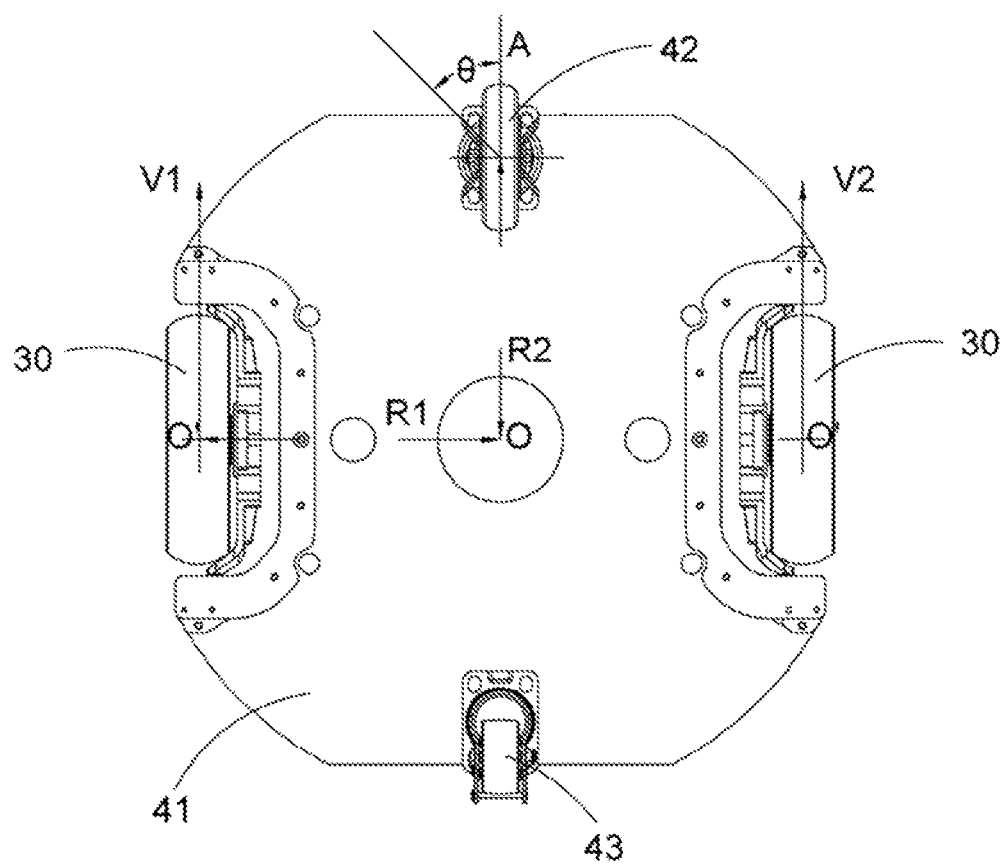
FIG. 3 schematically shows a top view of the chassis according to the embodiment of the present application.

Furthermore, as shown in FIG. 3, a line connecting the center points of the two driving wheels 30 is marked as O'O', which has a midpoint O. A line connecting the center point of the front guiding wheel 42 and the midpoint O is marked as OA. A distance from the center point of each driving wheel 30 to the midpoint O is assumed to be R1, and a distance from the center point of front guiding wheel 42 to the midpoint O is assumed to be R2. It's assumed that the two second driving motors have revolving speeds of V1 and V2 respectively, and the front guiding wheel 42 has a rotational angle of θ with respect to the line OA. The rotational angle θ would be adjusted by the first driving motor 44 according to the following formula:

$$\theta = \tan^{-1}\left(\frac{V_1 - V_2}{V_1 + V_2} \frac{R_2}{R_1}\right)$$

In the present embodiment, the driving wheel 30 and the second driving motor are integrally formed as a hub motor, and the first driving motor 44 and the two second driving motors are each a closed loop speed control motor. The closed loop speed control motor itself has a function of speed measurement and an algorithm for speed control. Thus, when coupled to the two second driving motors in a communication manner, the first driving motor 44 can receive signals of speeds from the two second driving motors, obtain a rotational angle resulted from the above-mentioned formula, and drive the front guiding wheel 42 to rotate in a certain angle to adapt to the condition of the road surface. The closed loop speed control motors adopted in the present application result in a simple structure of the chassis which does not require a control board. As an alternative, the first driving motor 44 and the two second driving motors are general motors. In this case, the general motors are provided with speed measurement elements which are electrically coupled, via wires, to a control board that is provided with a detection, calculation and control program. In this way, the closed loop speed control system can be formed between the first driving motor 44 and the two second driving motors. The control board calculates the rotational angle based on the data from the speed measurement elements, and controls the first driving motor 44 to adjust the rotational angle of the front guiding wheel 42.

The hanging unit 1 provided according to an embodiment of the present application is shown in FIGS. 4 to 7, including a mounting rack 10, a hanging rack 20 and a driving wheel 30. The mounting rack 10 is constructed as U-shaped in a transection. The U-shaped mounting rack 10 includes an opening, a bottom portion opposite to the opening and two arms extending from both ends of the bottom portion to the opening. The hanging rack 20 is arranged in the opening of the U-shaped mounting rack 10. The driving wheel 30 is rotatably connected to the hanging rack 20. The hanging rack 20 has two end portions arranged respectively in the two arms of the mounting rack 10 located at the opening. The end portions can be moved up and down along a height of the mounting rack 10. In the present embodiment, each of the arms is provided with a sliding slot 11 extending longitudinally along the height of the U-shaped mounting rack 10, i.e. in a vertical direction. The two end portions of the hanging rack 20 are respectively slidably mounted in the two sliding slots 11. As an alternative, no sliding slot 11 is provided, and instead, a sliding mechanism is directly arranged between the end portions of the hanging rack 20 and the arms of the mounting rack 10. Spring elements 12 are provided between the end portions of the hanging rack 20 and the arms at the opening of the mounting rack 10.

In the present application, displacement adjustment between the mounting rack 10 and the hanging rack 20 is implementable by means of the sliding slots 11 and the spring elements 12. The robot with such a simple and cost-effective configuration applied to the chassis can perform a more stable movement and have a capability of surmounting obstacles to adapt to different conditions of the road surface and thus to different working places.

Specifically, the hanging rack 20 includes a main body 21 and two mounting blocks 22. The mounting blocks 22 are perpendicularly positioned at both ends of the main body 21. The two mounting blocks 22 and the main body 21 are enclosed to form the U-shaped structure. Each sliding slot 11 of the mounting rack 10 is provided with a rail 13 therein. A sliding block 14 fixedly connected with the mounting block 22 is mounted on the rail 13 and is slidable therealong. Thereby, the mounting blocks 22 are moved along the rails 13 by the sliding blocks 14, so as to move the hanging rack 20 and the driving wheels 30 up and down.

Further, the mounting block 22 is provided with at least one mounting hole 23. The sliding block 14 is fixedly connected with the mounting block 22 via a fastener (not shown) mounted in the at least one mounting hole 23. Preferably, the fastener is at least one screw. Protrusions 24 are provided both below and above the at least one mounting hole 23 for limiting the movement of the sliding block 14. In this way, when moved together with the mounting block 22 along the rail 13, the sliding block 14 would stopped as soon as the protrusions 24 is contacted with the top or the bottom of the rail 13, such that the movement of the sliding block 14 is limited within a predetermined route.

Figure 7:
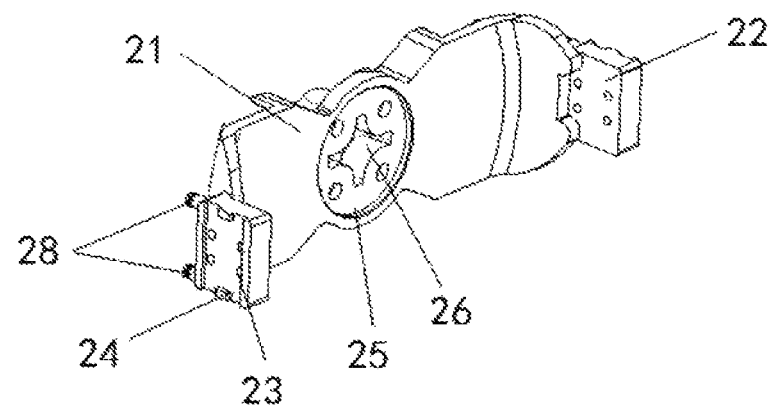
FIG. 7 schematically shows a structural view of a hanging rack of the hanging unit according to an embodiment of the present application.

As shown in FIG. 7, the main body 21 includes in its middle a mounting portion 25 for securing the driving wheel 30 thereto. The mounting portion 25 has a disk shape. The mounting portion 25 is provided with at least one through hole 26 with which wires of the hub motor can be guided therethrough. The driving wheel 30 is designed as a hub motor in which a power mechanism, a transmission mechanism and a brake mechanism are assembled, such that the structure of the driving wheel 30 is greatly simplified.

The main body 21 has two plate portions extending oppositely to each other at both sides of the mounting portion 25. A plurality of reinforcing ribs 27 are provided on a surface of the plate portions facing to the mounting rack 10. The reinforcing ribs 27 each longitudinally extends in a radial direction of the mounting portion 25. In the present embodiment, four reinforcing ribs 27 are provided and uniformly distributed in two crossing lines to form an X-shape. The reinforcing ribs 27 each has a certain height, and longitudinally extends in a predetermined angle with respect to a longitudinal direction of the main body 21. Such a configuration ensures the strength of the main body 21 while reducing its weight, and provides a stable support for the drive wheel 30.

Figure 5:
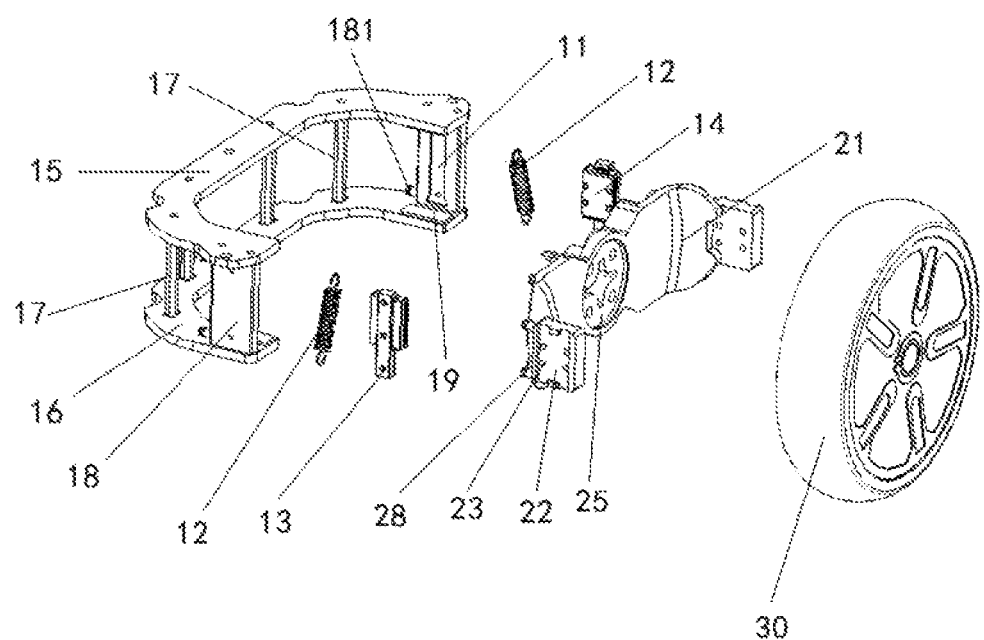
FIG. 5 schematically shows a exploded view of the hanging unit according to the embodiment of the present application.
Figure 6:
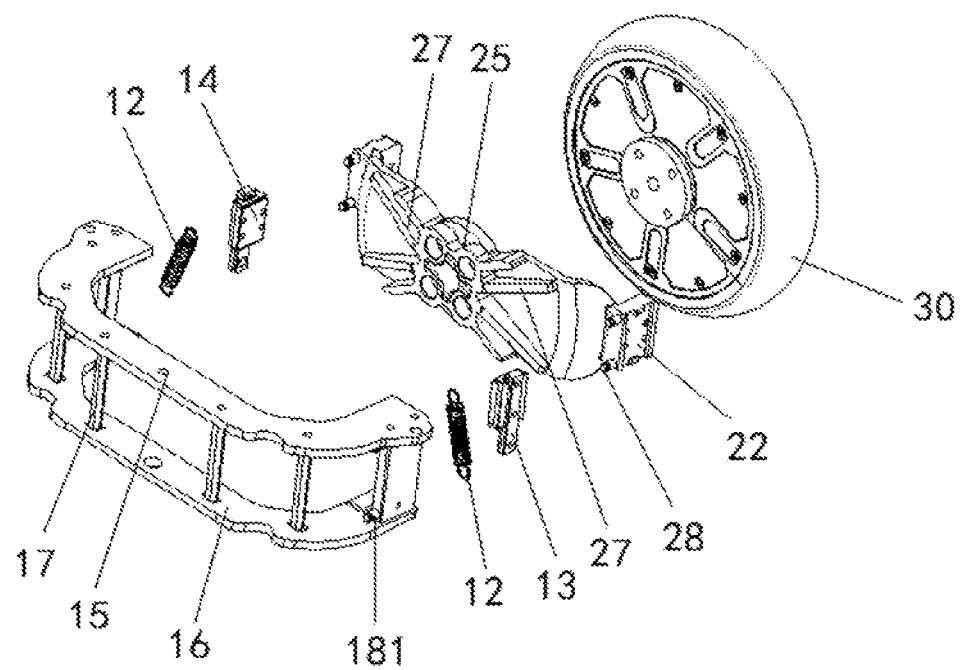
FIG. 6 schematically shows a further exploded view of the hanging unit according to the embodiment of the present application.

In the embodiment as shown in FIGS. 5 and 6, the U-shaped mounting rack 10 includes a top plate 15, a bottom plate 16 and a plurality of connecting columns 17. Each of the top plate 15 and the bottom plate 16 is horizontally placed and constructed as U-shaped in a transection thereof. The plurality of connecting columns 17 are arranged spacedly from each other and are vertically oriented to be connected between the top plate 15 and the bottom plate 16. Two vertically oriented connecting elements 18 are respectively provided at the two arms of the mounting rack 10 for connecting both ends of the top plate 15 with both ends of the bottom plates 16. Each connecting element 18 has the sliding slot 11 arranged therein.

Further, each sliding slot 11 is provided with two buffering pads 19 in front of an opening of the sliding slot 1. The buffering pads 19 are respectively arranged on the top plate 15 and the bottom plates 16 and faced to each other, providing a protection for the sliding block 14 to avoid collisions with the top plate 15 and the bottom plates 16.

In the present embodiment, each mounting block 22 has at least one first mounting column 28 protruding from a surface thereof facing to the bottom portion of the mounting rack 10. Each connecting element 18 has at least one second mounting column 181 oriented parallelly to the at least one first mounting column 28. Each spring element 12 is placed slantingly and has one end fixed to one of the at least one first mounting column 28 and has one other end fixed to one of the at least one second mounting column 181.

Figure 4:
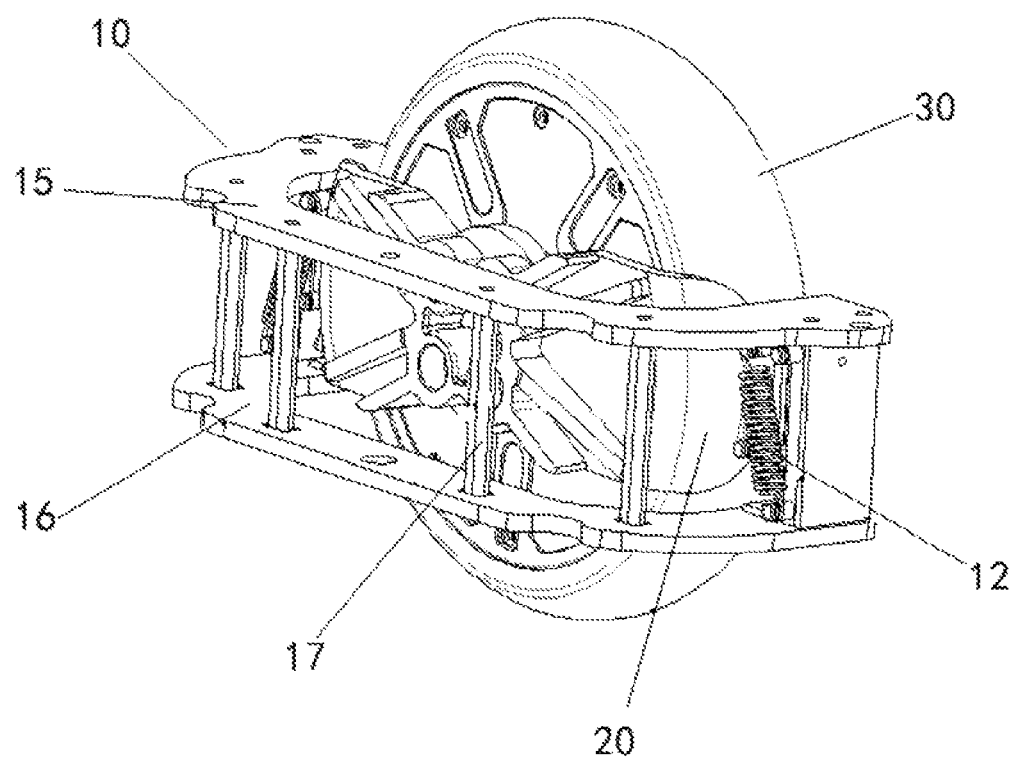
FIG. 4 schematically shows a structural view of a hanging unit according to an embodiment of the present application.

In the present embodiment, two first mounting columns 28 spaced from each other and two second mounting columns 181 spaced from each other are provided. As shown in FIG. 4, in the case that the spring element 12 has one end engaged with one of the first mounting columns 28 located in the upper of the hanging rack 20 and has one other end engaged with one of the second mounting columns 181 located in the lower of the mounting rack 10, the spring element 12 is preferably a tension spring as the spring element 12 is in a tension state due to the weight of the robot. On the contrary, in the other case that the spring element 12 has one end engaged with one of the first mounting columns 28 located in the lower of the hanging rack 20 and has one other end engaged with one of the second mounting columns 181 located in the upper of the mounting rack 10, the spring element 12 is preferably a compression spring as the spring element 12 is in a compression state due to the weight of the robot.

In a further embodiment of the present application, a robot is provided, including the chassis as stated above, as shown in FIG. 8. When the chassis according to the application is utilized in the robot, the mounting racks 10 are moved downward together with the frame 41 with respect to the hanging racks 20 due to the weight of the robot loaded on the frame 41, and meanwhile the spring elements 12 are tensioned. In the case that the robot walks in a flat road surface, the chassis works as a general four-wheeled chassis due to the adjustment and the slant arrangement of the spring elements 12. In the case that the robot walks in a rough road surface, the hanging racks 20 and the driving wheels 30 are moved upward in an uphill or moved downward in a groove, such that the driving wheels 30 are held being attached to the road surface without being suspended or slipped with respect to the road surface. Additionally, the suspension system 1 ensures a more smooth movement of the robot such that a rapid deceleration to some extent is acceptable to the robot, and meets a requirement of movement for a robot with a center of gravity in a high level such that no tilting accident of the robot occurs. As an alternative, the above-mentioned hanging unit 1 can be provided to the robot by means of other structures, as long as the above-mentioned effects can be achieved. Meanwhile, the front guiding wheel 42 has the capability of active adjustment that the rotational angle of the front guiding wheel 42 can be adjusted according to the speeds of the driving wheels 30, so that the front guiding wheel 42 can have its diameter to be designed larger to make the robot perform better and more stably in surmounting obstacles. The robot is provided with a main control board therein for controlling the operation of the robot. The first driving motor 44 of the front guiding wheel 42 and the two second driving motors are electrically coupled to the main control board which in turn controls the first driving motor 44 to adjust the rotational angle of the front guiding wheel 42 on the basis of the condition of the road surface and the real-time walking state of the robot.

It should be appreciated that the chassis according to the present application is also applicable to any moveable objects such as a vehicle other than the robot.

Described above are only preferred embodiments of the present application, and any equivalent changes and modification made within the scope of the claims of the present application shall be covered by the scope of the claims of the present application.

What is claimed is:

1. A chassis, comprising a frame, two hanging units symmetrically provided at both sides of the frame, and a front guiding wheel and a rear universal wheel provided below the frame, wherein each of the hanging units comprises a mounting rack fixedly connected to the frame, a hanging rack slidably connected to the mounting rack, and a driving wheel rotatably connected to the hanging rack, and wherein the front guiding wheel is provided with a first driving motor, and the driving wheel of each hanging unit is driven by a second driving motor, and wherein a closed loop speed control system is formed between the first driving motor and both second driving motors, in such a way that a rotational angle of the front guiding wheel is adjustable by the first driving motor when revolving speeds of both second driving motors are changed, and wherein a line connecting the center points of the two driving wheels is marked as O'O', which has a midpoint O, and a line connecting the center point of the front guiding wheel and the midpoint O is marked as OA, and a distance from the center point of each driving wheel to the midpoint O is R1, and a distance from the center point of front guiding wheel to the midpoint O is R2, and the two second driving motors have revolving speeds of V1 and V2, respectively, and the rotational angle of the front guiding wheel with respect to the line OA is θ, which is adjustable by the first driving motor according to a formula of:

$$\theta = \tan^{-1}\left(\frac{V_1 - V_2}{V_1 + V_2} \frac{R_2}{R_1}\right).$$

2. The chassis according to claim 1, wherein the mounting rack comprises an opening, a bottom portion opposite to the opening and two arms extending from both ends of the bottom portion to the opening, and the hanging rack comprises two end portions arranged in the two arms of the mounting rack located at the opening, and the end portions are movable along a height of the mounting rack, and spring elements are provided between the end portions of the hanging rack and the arms at opening of the mounting rack.

3. The chassis according to claim 2, wherein the hanging rack comprises a main body connected to the driving wheel, and two mounting blocks positioned at both ends of the main body to form an U-shaped structure with the main body, and the arms of the mounting rack each comprises a rail with a sliding block slidable therealong, and the sliding block is fixedly connected with a respective one of the mounting blocks.

4. The chassis according to claim 3, wherein the main body comprises in middle thereof a mounting portion connected to the driving wheel, a plurality of reinforcing ribs are provided on a surface of the main body facing to the mounting rack, the plurality of reinforcing ribs each longitudinally extends in a radial direction of the mounting portion.

5. The chassis according to claim 4, wherein the driving wheel and the second driving motor are integrally formed as a hub motor, and the mounting portion is provided with at least one through hole with which wires of the hub motor can be guided therethrough.

6. The chassis according to claim 3, wherein the mounting rack comprises a top plate constructed as U-shaped in a transection thereof, a bottom plate constructed as U-shaped in a transection thereof and a plurality of connecting columns vertically oriented and connected between the top plate and the bottom plate, and wherein the top plate, the bottom plate and the plurality of connecting columns are assembled to form a U-shaped structure with the opening, and two vertically oriented connecting elements are provided at the two arms of the mounting rack for connecting both ends of the top plate with both ends of the bottom plates, the connecting elements each has the rail arranged therein.

7. The chassis according to claim 6, wherein two buffering pads for protecting the sliding block are arranged on the top plate and the bottom plates and faced to each other.

8. The chassis according to claim 6, wherein the mounting blocks each has at least one first mounting column protruding from a surface thereof facing to the bottom portion of the mounting rack, the connecting elements each has at least one second mounting column oriented parallelly to the at least one first mounting column, the spring elements each is placed slantingly and has one end fixed to one of the at least one first mounting column and has one other end fixed to one of the at least one second mounting column.

9. A chassis, comprising a frame, two hanging units symmetrically provided at both sides of the frame, and a front guiding wheel and a rear universal wheel provided below the frame, wherein each of the hanging units comprises a mounting rack fixedly connected to the frame, a hanging rack slidably connected to the mounting rack, and a driving wheel rotatably connected to the hanging rack, and wherein the front guiding wheel is provided with a first driving motor, and the driving wheel of each hanging unit is driven by a second driving motor, and wherein a closed loop speed control system is formed between the first driving motor and both second driving motors in such a way that a rotational angle of the front guiding wheel is adjustable by the first driving motor when revolving speeds of both second driving motors are changed, and wherein the mounting rack comprises an opening, a bottom portion opposite to the opening and two arms extending from both ends of the bottom portion to the opening, and the hanging rack comprises two end portions arranged in the two arms of the mounting rack located at the opening, and the end portions are movable along a height of the mounting rack, and spring elements are provided between the end portions of the hanging rack and the arms at opening of the mounting rack.

10. The chassis according to claim 9, wherein the hanging rack comprises a main body connected to the driving wheel, and two mounting blocks positioned at both ends of the main body to form an U-shaped structure with the main body, and the arms of the mounting rack each comprises a rail with a sliding block slidable therealong, and the sliding block is fixedly connected with a respective one of the mounting blocks.

11. The chassis according to claim 10, wherein the main body comprises in middle thereof a mounting portion connected to the driving wheel, a plurality of reinforcing ribs are provided on a surface of the main body facing to the mounting rack, the plurality of reinforcing ribs each longitudinally extends in a radial direction of the mounting portion.

12. The chassis according to claim 11, wherein the driving wheel and the second driving motor are integrally formed as a hub motor, and the mounting portion is provided with at least one through hole with which wires of the hub motor can be guided therethrough.

13. The chassis according to claim 10, wherein the mounting rack comprises a top plate constructed as U-shaped in a transection thereof, a bottom plate constructed as U-shaped in a transection thereof and a plurality of connecting columns vertically oriented and connected between the top plate and the bottom plate, and wherein the top plate, the bottom plate and the plurality of connecting columns are assembled to form a U-shaped structure with the opening, and two vertically oriented connecting elements are provided at the two arms of the mounting rack for connecting both ends of the top plate with both ends of the bottom plates, the connecting elements each has the rail arranged therein.

14. The chassis according to claim 13, wherein two buffering pads for protecting the sliding block are arranged on the top plate and the bottom plates and faced to each other.

15. The chassis according to claim 13, wherein the mounting blocks each has at least one first mounting column protruding from a surface thereof facing to the bottom portion of the mounting rack, the connecting elements each has at least one second mounting column oriented parallelly to the at least one first mounting column, the spring elements each is placed slantingly and has one end fixed to one of the at least one first mounting column and has one other end fixed to one of the at least one second mounting column.

16. A chassis, comprising
a frame,
two hanging units symmetrically provided at both sides of the frame, and
a front guiding wheel and a rear universal wheel provided below the frame;
wherein each of the hanging units comprises a mounting rack fixedly connected to the frame, a hanging rack slidably connected to the mounting rack, and a driving wheel rotatably connected to the hanging rack; and
wherein the front guiding wheel is provided with a first driving motor, and the driving wheel of each hanging unit is driven by a second driving motor to rotate about a first axis, and the front guiding wheel is driven by the first driving motor to rotate about a second axis perpendicular to the first axis, a rotational angle of the front guiding wheel about the first axis is adjustable when revolving speeds of both second driving motors are changed.

17. The chassis according to claim 16, wherein the front guiding wheel has a diameter larger than that of the rear universal wheel.

* * * * *